US008888008B2

(12) United States Patent
Teshima

(10) Patent No.: US 8,888,008 B2
(45) Date of Patent: Nov. 18, 2014

(54) RFID ANTENNA MODULE AND ELECTRONIC APPARATUS

(71) Applicant: Kabushiki Kaisha Toshiba, Tokyo (JP)

(72) Inventor: Masao Teshima, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/648,696

(22) Filed: Oct. 10, 2012

(65) Prior Publication Data

US 2013/0134225 A1    May 30, 2013

(30) Foreign Application Priority Data

Nov. 29, 2011    (JP) ................. 2011-260327

(51) Int. Cl.
*G06K 19/06* (2006.01)
*G06K 19/07* (2006.01)

(52) U.S. Cl.
CPC .................. *G06K 19/0723* (2013.01)
USPC ....................................... 235/492

(58) Field of Classification Search
CPC ........ H01Q 7/06; H01Q 7/08; G06K 19/0723
USPC ............ 235/492; 343/702; 336/221; 348/345
See application file for complete search history.

(56) References Cited

U.S. PATENT DOCUMENTS

| 7,000,837 | B2 | 2/2006 | Akiho et al. |
| 7,050,007 | B2 | 5/2006 | Akiho et al. |
| 7,183,987 | B2 | 2/2007 | Akiho et al. |
| 7,336,270 | B2 | 2/2008 | Sato |
| 8,289,438 | B2 * | 10/2012 | Yeh ................... 348/345 |
| 2009/0189729 | A1 * | 7/2009 | Kubo et al. ........... 336/221 |
| 2011/0309998 | A1 | 12/2011 | Sakurai |
| 2012/0223866 | A1 * | 9/2012 | Ayala Vazquez et al. ..... 343/702 |
| 2012/0262348 | A1 | 10/2012 | Kubo et al. |

FOREIGN PATENT DOCUMENTS

| JP | 2001-266100 |  | 9/2001 |
| JP | 2004-166176 | A2 | 6/2004 |
| JP | 2004-302435 | A2 | 10/2004 |
| JP | 2006-148462 | A2 | 6/2006 |
| JP | 2007-124557 | A2 | 5/2007 |
| JP | 2010-039704 |  | 2/2010 |
| JP | 2010-171857 |  | 8/2010 |
| JP | 2011-091744 | A2 | 5/2011 |
| WO | WO 2010/098269 |  | 9/2010 |
| WO | WO 2011/077878 |  | 6/2011 |

OTHER PUBLICATIONS

Office Action received in Japanese Patent Application No. 2011-260327, mailed on Mar. 12, 2013; in 7 pages.

* cited by examiner

*Primary Examiner* — Thien M Le
*Assistant Examiner* — Asifa Habib
(74) *Attorney, Agent, or Firm* — Knobbe, Martens, Olson & Bear LLP

(57) ABSTRACT

According to one embodiment, an RFID antenna module includes an insulating substrate, a loop coil antenna and a magnetic part. The antenna is provided on the insulating substrate. The magnetic part is provided on the insulating substrate to be positioned behind the antenna. The insulating substrate is bent such that the antenna is directed in a plurality of directions.

12 Claims, 9 Drawing Sheets

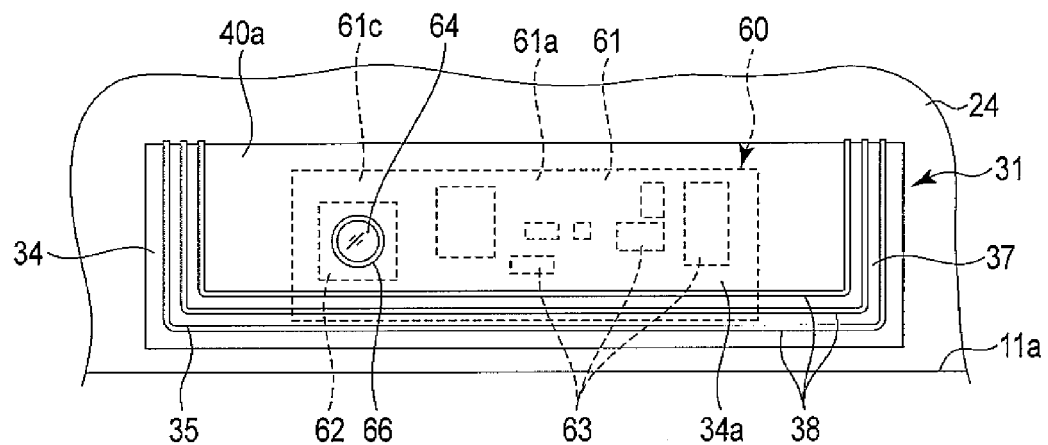
F I G. 9
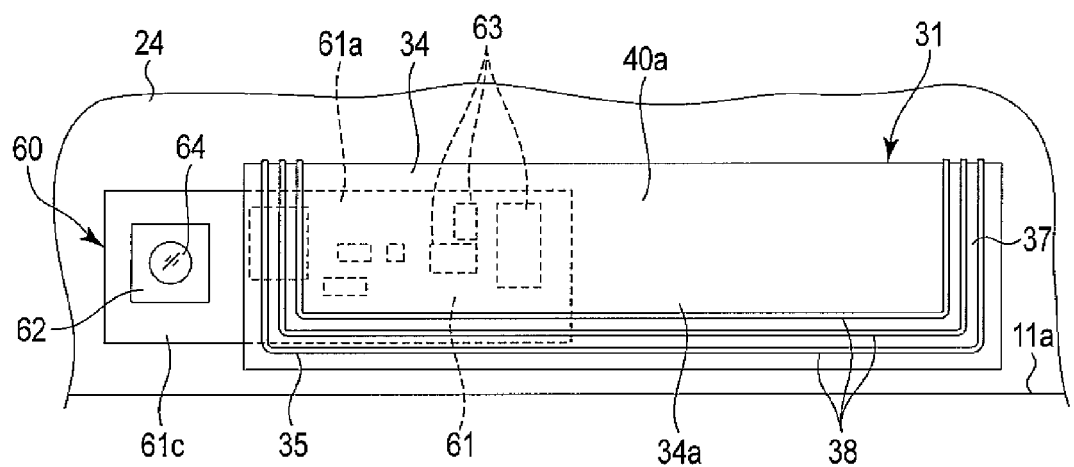
F I G. 10

RFID ANTENNA MODULE AND ELECTRONIC APPARATUS

CROSS-REFERENCE TO RELATED APPLICATIONS

This application is based upon and claims the benefit of priority from prior Japanese Patent Application No. 2011-260327, filed Nov. 29, 2011, the entire contents of which are incorporated herein by reference.

FIELD

Embodiments described herein relate generally to an RFID antenna module which includes a bent insulating substrate, and an electronic apparatus equipped with the RFID antenna module.

BACKGROUND

RFID systems which exchange information by short-range wireless communication are introduced into electronic apparatuses such as portable computers, for authentication such as security lock authentication. In electronic apparatuses of the prior art which have an RFID function, an RFID module is disposed inside the housing. The antenna module has a flat insulating substrate equipped with a loop coil antenna. The insulating substrate is contained inside the housing, in a state, for example, in which it runs along the internal surface of the housing.

According to RFID modules of the prior art, it is necessary to increase the area of the antenna to enhance the communication performance using electromagnetic waves. Increasing the area of the antenna, however, leads to an increase in size of the insulating substrate, and is an obstacle to making the RFID antenna module compact. In addition, it is required to secure a wide space to contain the RFID module inside the housing, and it is undeniable that the space for installing the RFID antenna module is restricted.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 9 is an exemplary front view illustrating the positional relation between the RFID antenna module and a camera of the camera module in the third embodiment;

FIG. 10 is an exemplary front view illustrating the positional relation between an RFID antenna module and a camera of a camera module in a fourth embodiment;

DETAILED DESCRIPTION

Various embodiments will be described hereinafter with reference to the accompanying drawings. In general, according to one embodiment, an RFID antenna module includes an insulating substrate, a loop coil antenna and a magnetic part. The antenna is provided on the insulating substrate. The magnetic part is provided on the insulating substrate to be positioned behind the antenna. The insulating substrate is bent such that the antenna is directed in a plurality of directions.

[First Embodiment]

Figure 1:
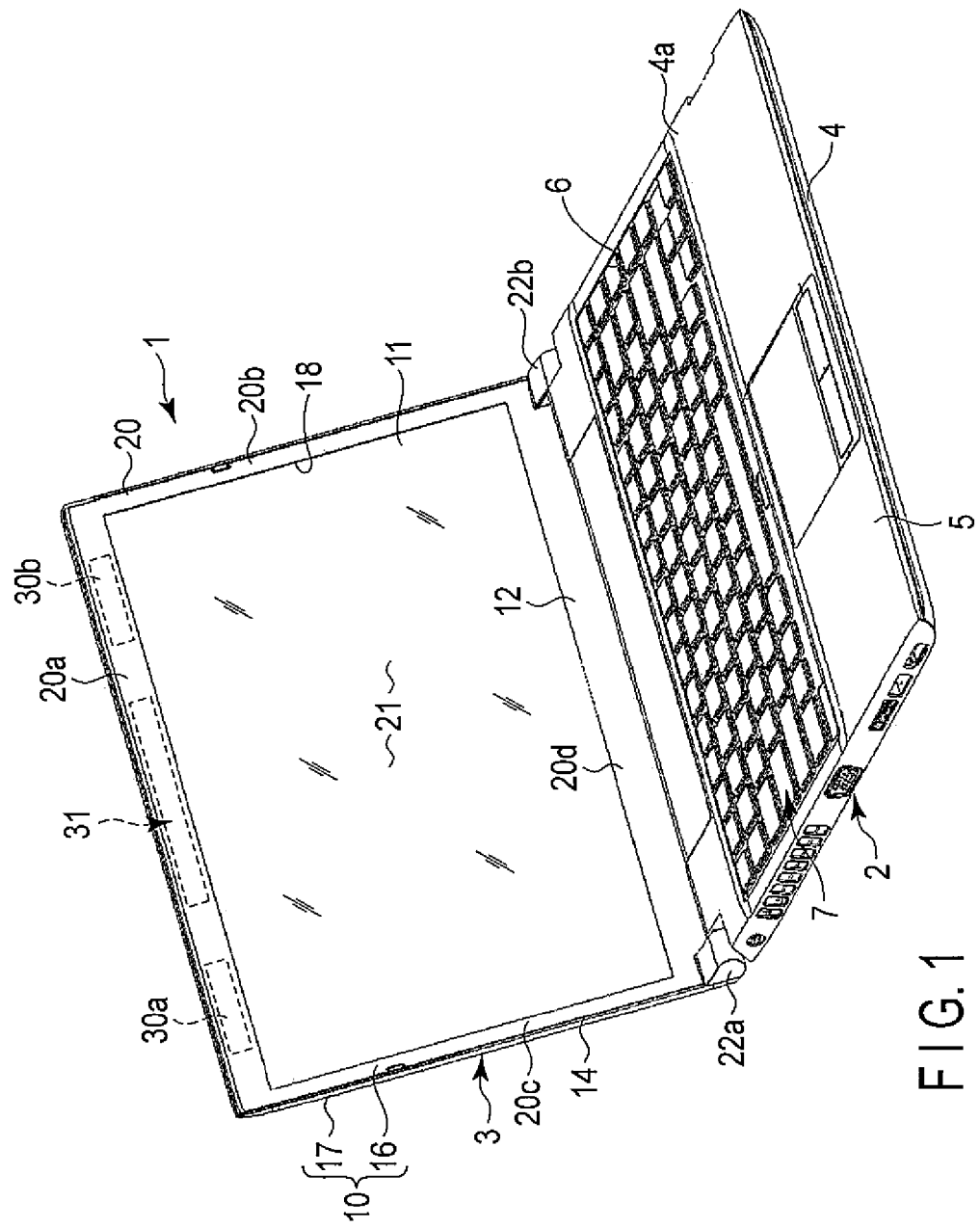
FIG. 1 is an exemplary perspective view of a portable computer according to a first embodiment.

A first embodiment will be explained hereinafter with reference to FIG. 1 to FIG. 7. FIG. 1 discloses a notebook portable computer 1 which is an example of an electronic apparatus. The portable computer 1 comprises an apparatus main body 2, and a display unit 3 which is supported by the apparatus main body 2.

The apparatus main body 2 includes a first housing 4. The first housing 4 has a rectangular box shape, and contains main constituent elements such as a mother board, on which a CPU is mounted, and a hard disk drive.

The first housing 4 includes an upper surface 4a. The upper surface 4a includes a flat palm rest 5 and a keyboard attaching part 6. The palm rest 5 extends in a width direction of the first housing 4, in a front half part of the upper surface 4a. The keyboard attaching part 6 is a rectangular depression which is depressed to be lower than the palm rest 5, and positioned behind the palm rest 5. A keyboard 7 is set in the keyboard attaching part 6. The keyboard 7 is exposed to the upper surface 4a of the first housing 4 to adjoin the palm rest 5.

The display unit 3 includes a second housing 10 and a display module 11. The second housing 10 is formed of a non-conductor such as a synthetic resin material. The second housing 10 has a rectangular box shape which has almost the same size as that of the first housing 4, and includes a front wall 12, a rear wall 13, and a peripheral wall 14. The front wall 12 is an example of a first wall. The front wall 12 is provided with a rectangular opening part 18. The rear wall 13 is an example of a second wall. The rear wall 13 is positioned opposite to the front wall 12 along a thickness direction of the second housing 10.

According to the first embodiment, the second housing 10 includes a display mask 16 and a display cover 17. The display mask 16 includes the front wall 12, and forms a frame 18 which encloses the opening part 18. The display cover 17 is combined with the display mask 16, and forms an outer wall of the second housing 10. The rear wall 13 of the display cover 17 is opposed to the front wall 12 and the opening part 18 of the display mask 16.

The display module 11 is contained in the second housing 10. The display module 11 has a flat plate shape, and includes a screen 21 which displays pictures and images. The screen 21 is exposed to the outside of the display unit 3 through the opening part 18 of the display mask 16.

As illustrated in FIG. 1, a pair of hinge parts 22a and 22b are formed at one end of the second housing 10. The hinge parts 22a and 22b are connected to a rear end part of the first housing 4 through hinges.

The display unit 3 is rotatable between a first position and a second position, with the hinge parts 22a and 22b used as fulcrums. In the first position, the display unit 3 is laid down on the apparatus main body 2 such that the screen 21 is opposed to the palm rest 5 and the keyboard 7. In the second position, the display unit 3 stands from the rear end part of the apparatus main body 2 to expose the palm rest 5, the keyboard 7 and the screen 21.

As illustrated in FIG. 1, the frame 20 of the display mask 16 includes first to fourth edge parts 20a, 20b, 20c, and 20d. The first edge part 20a extends on an upper side of the screen 21 and in a width direction of the screen 21, when the display unit 3 is rotated to the second position. The second edge part 20b extends on the right of the screen 21 and in a height direction of the screen 21, when the display unit 3 is rotated to the second position. The third edge part 20c extends on the left of the screen 21 and in the height direction of the screen 21, when the display unit 3 is rotated to the second position. The fourth edge part 20d extends under the screen 21 and in the width direction of the screen 21, when the display unit 3 is rotated to the second position.

Figure 6:
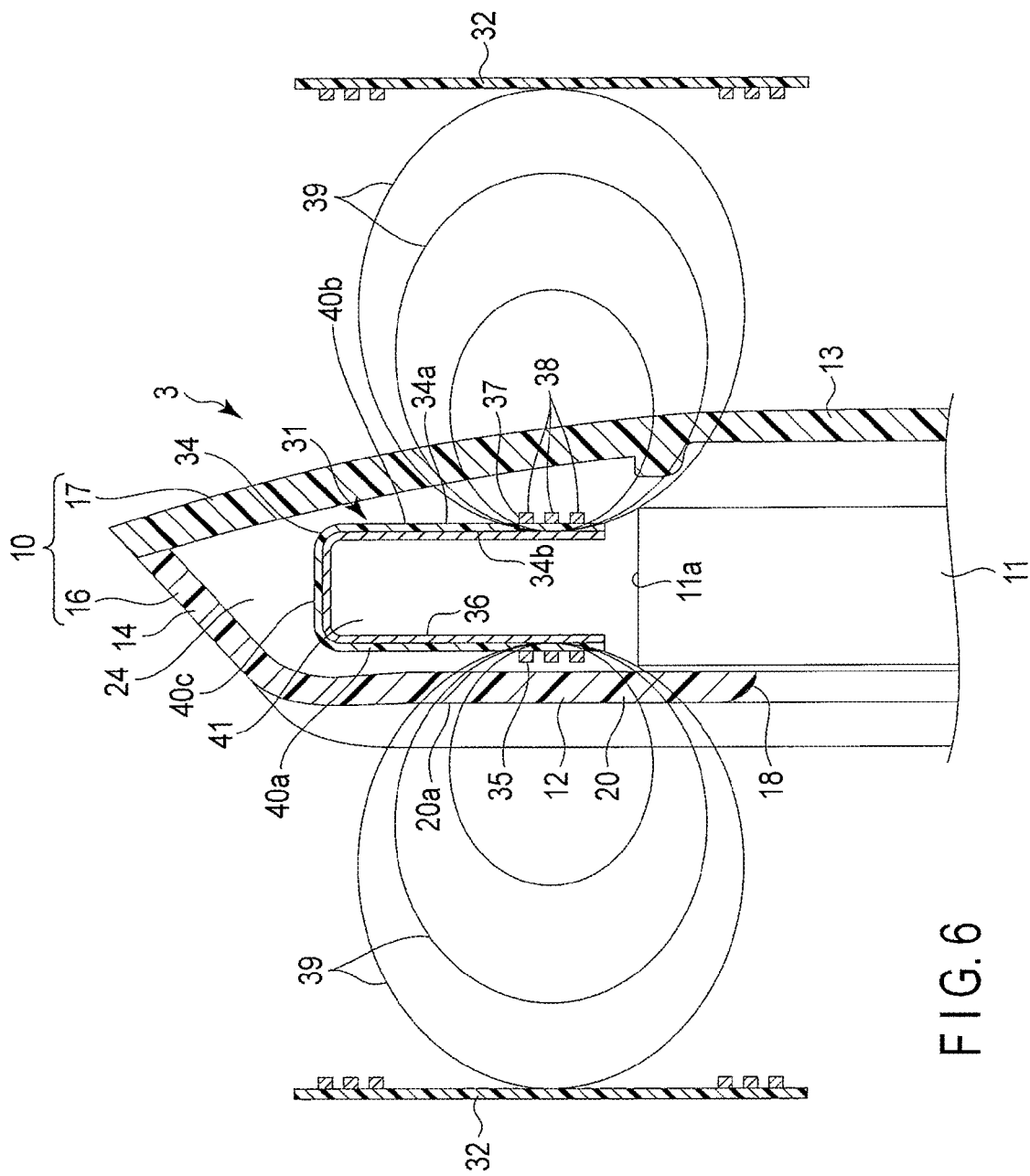
FIG. 6 is an exemplary cross-sectional view of a state where information is exchanged between the RFID antenna module included in the portable computer and an RFID card by wireless communication using electromagnetic waves, in the first embodiment.

As best illustrated in FIG. 6, a mounting space 24 is provided inside the second housing 10. The mounting space 24 extends in a width direction of the display module 11, between the first edge part 20a of the frame 20 and the rear wall 13 of the display cover 17. In addition, the mounting space 24 is positioned around the display module 11 inside the second housing 10, and positioned out of the display module 11.

As illustrated in FIG. 1, a pair of wireless-LAN antennas 30a and 30b and an RFID antenna module 31 for personal authentication are arranged in the mounting space 24 of the second housing 10. The antennas 30a and 30b are positioned in an upper end part of the display unit 3 and distant from each other in a width direction of the display unit 3, when the display unit 3 is rotated to the second position.

The RFID antenna module 31 is an element which exchanges information with an RFID card 32 which is held by the user, by short-range wireless communication using electromagnetic waves. The RFID antenna module 31 is disposed between the antennas 30a and 30b.

As illustrated in FIG. 2 to FIG. 5, the RFID antenna module 31 includes an insulating substrate 34, an antenna 35, and a magnetic part 36. The insulating substrate 34 is formed of a flexible insulating film such as a polyimide film and a polyester film. The insulating substrate 34 has a rectangular shape which includes long sides and short sides, and includes a surface 34a and a back surface 34b.

Figure 2:
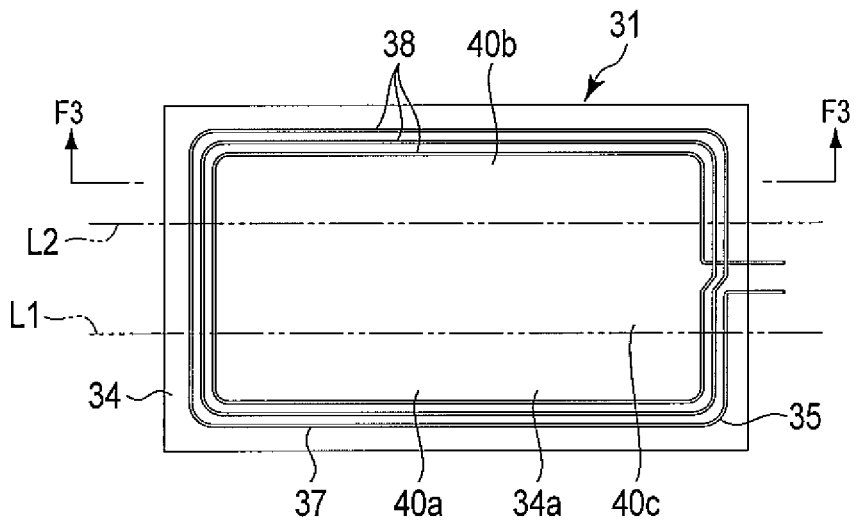
FIG. 2 is an exemplary plan view of an RFID antenna module, illustrating a state where an insulating substrate is developed into a flat shape.
Figure 3:
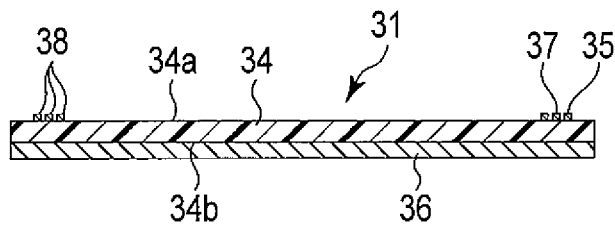
FIG. 3 is an exemplary cross-sectional view taken along line F3-F3 of FIG. 2.

The antenna 35 is superposed on the surface 34a of the insulating substrate 34. The antenna 35 includes an antenna pattern 37 which is formed of metal foil such as copper foil, or conductive paste. The antenna pattern 37 is formed in a loop coil shape in a circumferential part of the surface 34a of the insulating substrate 34, to run along the long sides and the short sides of the insulating substrate 34. Specifically, as illustrated in FIG. 2, the antenna pattern 37 includes a plurality of rectangular loop parts 38. The loop parts 38 are arranged at intervals to surround the center part of the insulating substrate 34. Adjacent loop parts 38 are arranged at almost regular intervals.

The magnetic part 36 is formed of a sheet-like composite material which is obtained by, for example, including magnetic powder having large magnetic permeability in a rubber binder. The magnetic part 36 has a rectangular shape which has a size corresponding to the insulating substrate 34. The magnetic part 36 is adhered to the back surface 34b of the insulating substrate 34. Therefore, the magnetic part 36 is positioned in the rear of the antenna 35, and has a function of causing electromagnetic waves 39, which are generated from the antenna 35, to detour, such that the electromagnetic waves 39 run along the back surface 34b of the insulating substrate 34.

Figure 5:
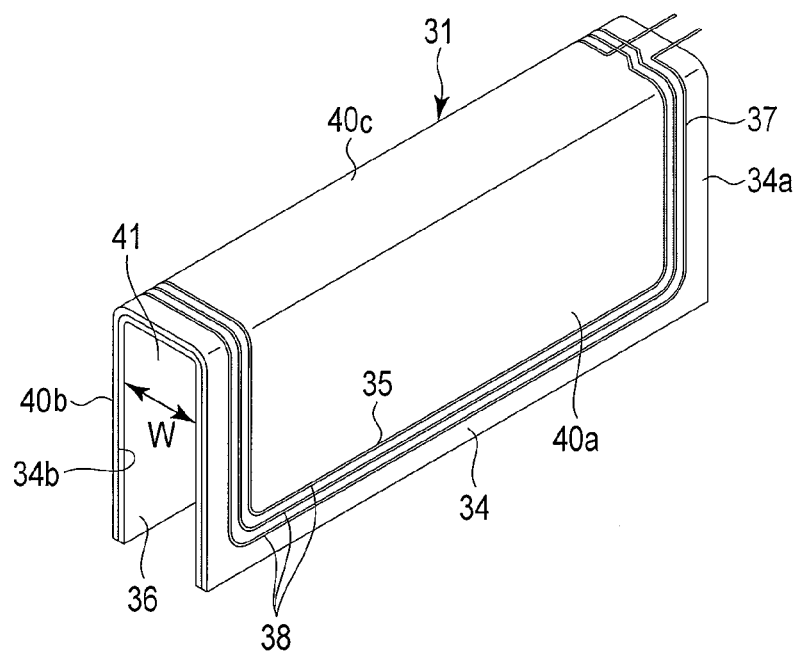
FIG. 5 is an exemplary perspective view of the RFID antenna module in the state where the insulating substrate is bent.

As illustrated in FIG. 2, FIG. 5, and FIG. 6, the RFID antenna module 31 is bent along two straight lines L1 and L2 which are defined on the insulating substrate 34. The straight lines L1 and L2 run along the long sides of the insulating substrate 34, and extend in parallel with each other with an interval between them in a direction of the short sides of the insulating substrate 34.

The insulating substrate 34 is divided into first to third substrate parts 40a, 40b, and 40c, with the straight lines L1 and L2 used as boundaries. The first substrate part 40a is formed by bending the insulating substrate 34 at almost right angles along the straight line L1. In the same manner, the second substrate part 40b is formed by bending the insulating substrate 34 at almost right angles along the straight line L2.

By these bending, the magnetic part 36 is positioned inside the insulating substrate 34 along a direction of bending the insulating substrate 34. Simultaneously with this, a part of the insulating substrate 34, which is located between the straight lines L1 and L2, forms the third substrate part 40c. The third substrate part 40c has an almost flat shape which extends between one side edge of the first substrate part 40a and one side edge of the second substrate part 40b.

The first substrate part 40a and the second substrate part 40b are directed in the same direction with respect to the third substrate part 40c. Therefore, the RFID antenna module 31 is bent such that the first substrate part 40a and the second substrate part 40b of the insulating substrate 34 are opposed to each other, with the magnetic part 36 interposed therebetween.

By this bending, a space 41 is formed between the first substrate part 40a and the second substrate part 40b. The space 41 has a width W which corresponds to the third substrate part 40c, and opened to an end surface 11a of the circumferential part of the display module 11. In addition, since the insulating substrate 34 is bent, the magnetic part 36 faces the space 41.

Figure 4:
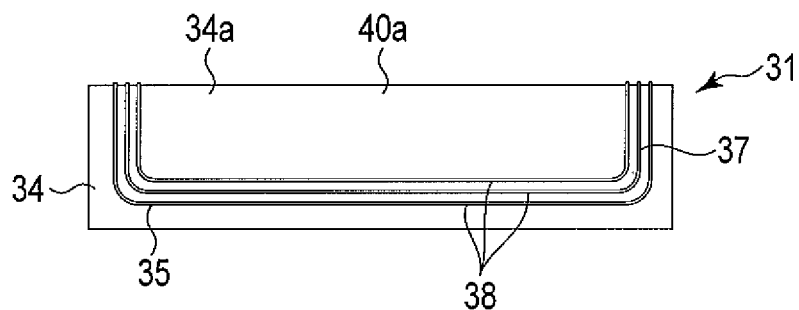
FIG. 4 is an exemplary front view of the RFID antenna module in a state where the insulating substrate is bent.

As illustrated in FIG. 2 and FIG. 4, each of the first substrate part 40a and the second substrate part 40b has a rectangular shape which has long sides and short sides. The first substrate part 40a and the second substrate part 40b have areas which exactly agree with each other. In addition, the loop parts 38 of the antenna pattern 37 are arranged to run along the long side and the short sides of the first substrate part 40a and the long side and the short sides of the second substrate part 40b.

As illustrated in FIG. 6, the first substrate part 40a of the RFID antenna module 31 faces an internal surface of the front wall 12 in the mounting space 24. In the same manner, the second substrate part 40b faces an internal surface of the rear wall 13 in the mounting space 24. Therefore, the antenna pattern 37 which is arranged to run along the long side and the short sides of the first substrate part 40a is directed in a first direction which goes from the mounting space 24 to the front wall 12. In the same manner, the antenna pattern 37 which is arranged to run along the long side and the short sides of the second substrate part 40b is directed in a second direction which goes from the mounting space 24 to the rear wall 13. The second direction is a direction reverse to the first direction. In other words, the first direction and the second direction are opposite to each other in the direction running along the thickness direction of the second housing 10. As a result, the antenna 35 is directed in a plurality of directions running along the thickness direction of the second housing 10 inside the second housing 10, by bending the RFID antenna module 31.

In addition, in the first embodiment, the RFID antenna module 31 is fixed onto the internal surface of the front wall 12 or the internal surface of the rear wall 13, by means such as bonding.

FIG. 6 illustrates a state where information is exchanged by the user between the RFID antenna module 31 contained in the portable computer 1 and the RFID card 32.

When the RFID card 32 is brought close to the front wall 12 or the rear wall 13 of the second housing 10, in a position corresponding to the RFID antenna module 31, the RFID antenna module 31 is connected to the RFID card 32 by electromagnetic induction. Thereby, electromagnetic waves 39 for communication are generated between the RFID antenna module 31 and the RFID card 32.

Specifically, when the RFID card 32 is brought close to the front wall 12 of the second housing 10, electromagnetic waves 39 are formed between the antenna 35 on the first substrate part 40a and the RFID card 32. Since the first substrate part 40a includes the magnetic part 36 which is superposed on the first substrate part 40a to be positioned in the rear of the antenna 35, the electromagnetic waves 39 which have passed through the first substrate part 40a are blocked by the magnetic part 36. Thereby, the electromagnetic waves 39 are caused to detour to run along the surface direction of the first substrate part 40a, and the electromagnetic waves 39 hardly pass through the mounting space 24 of the second housing 10 toward the rear wall 13 of the second housing 10.

On the other hand, when the RFID card 32 is brought close to the rear wall 13 of the second housing 10, electromagnetic waves 39 are formed between the antenna 35 on the second substrate part 40b and the RFID card 32. Since the second substrate part 40b includes the magnetic part 36 which is superposed on the second substrate part 40b to be positioned in the rear of the antenna 35, the electromagnetic waves 39 which have passed through the second substrate part 40b are blocked by the magnetic part 36. Therefore, the electromagnetic waves 39 are caused to detour to run along the surface direction of the second substrate part 40b, and hardly pass through the mounting space 24 of the second housing 10 toward the front wall 12 of the second housing 10.

In addition, in the first embodiment, the space 41 which corresponds to the third substrate part 40c is secured between the first substrate part 40a and the second substrate part 40b. Thereby, the antenna 35 on the first substrate part 40a and the antenna 35 on the second substrate part 40b are located distant from each other. Consequently, it is possible to prevent interference of communication magnetic fields between the antenna 35 of the first substrate part 40a and the antenna 35 of the second substrate part 40b.

Therefore, the communication magnetic fields are prevented from being cancelled, wireless communication can be performed on both the side of the front wall 12 and the side of the rear wall 13 of the second housing 10, and good communication performance can be obtained.

In addition, according to the first embodiment, the RFID antenna module 31 is bent to have a three-dimensional shape, by being bent along two straight lines L1 and L2. Therefore, supposing that each area of the first substrate part 40a and the second substrate part 40b which contribute to communication is the same as the area of a flat RFID antenna module of the prior art, the area of the insulating substrate 34 when the insulating substrate 34 of the RFID antenna module 31 is developed into a plane shape can be expanded in comparison with that of the prior art.

Therefore, it is possible to increase intervals between the loop parts 38 which form the antenna 35. Simultaneously, it is possible to increase the whole length of the antenna pattern 37 which runs along the long sides and the short sides of the first and second substrate parts 40a and 40b, and increase the opening area of the antenna 35 which is defined by the antenna pattern 37.

Consequently, the electromagnetic force which is generated in the antenna 35 by electromagnetic induction increases. This structure produces a structure which increases the gain of the antenna 35 and is advantageous for securing a communication distance.

In addition, since the RFID antenna module 31 is bent to have a three-dimensional shape, the area occupied by the first to third substrate parts 40a, 40b, and 40c is reduced, and the RFID antenna module 31 can be made compact. Therefore, it is possible to dispose the RFID antenna module 31 which has good communication performance, without expanding the mounting space 24 inside the second housing 10.

The shape of the RFID antenna module is not limited to that of the first embodiment. For example, the third substrate part may be curved to draw a smooth arc.

Further, a flat insulating substrate may be folded along one straight line, and the first substrate part and the second substrate part may be superposed on each other such that the magnetic parts on them are brought into close contact with each other. Therefore, the third substrate part of the insulating substrate is not an indispensable constituent element, but may be omitted according to the shape of the bent insulating substrate.

[Second Embodiment]

Figure 7:
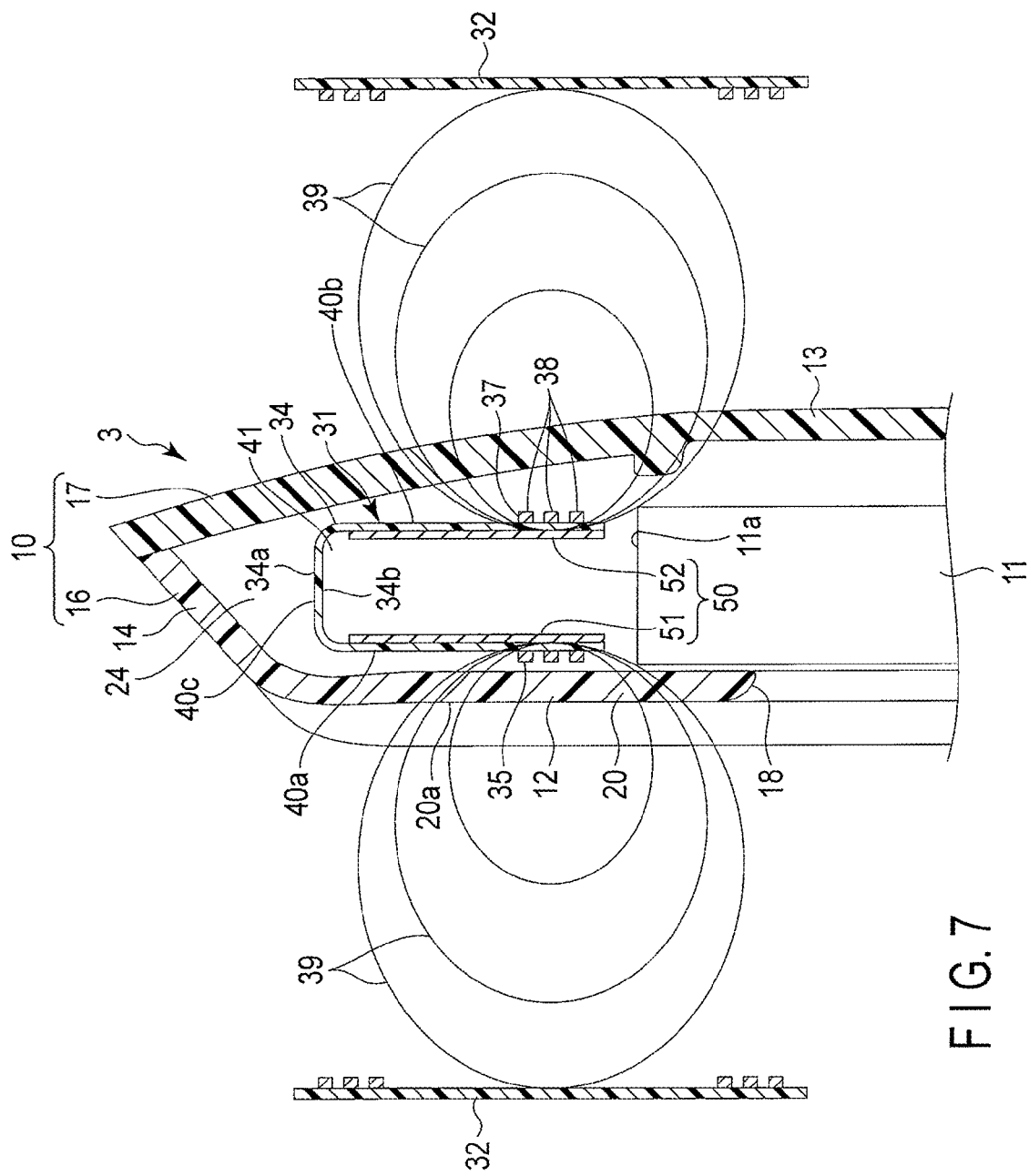
FIG. 7 is an exemplary cross-sectional view of a state where information is exchanged between an RFID antenna module included in a portable computer and an RFID card by wireless communication using electromagnetic waves, in a second embodiment.

FIG. 7 discloses a second embodiment.

The second embodiment is different from the first embodiment, in the matter relating to a magnetic part which causes electromagnetic waves to detour. The other structures of the RFID antenna module and the portable computer of the second embodiment are the same as those of the first embodiment. Therefore, in the second embodiment, constituent elements which are the same as those in the first embodiment are denoted by the same respective reference numerals, and explanation thereof is omitted.

As illustrated in FIG. 7, a magnetic part 50 which is superposed on a back surface 34b of an insulating substrate 34 is divided into a first sheet part 51 and a second sheet part 52. The first sheet part 51 has a rectangular shape which has a size that corresponds to a first substrate part 40a. The first sheet part 51 is adhered to the first substrate part 40a, and positioned in the rear of an antenna 35 located on the first substrate 40a.

The second sheet part 52 has a rectangular shape which has a size that corresponds to a second substrate part 40b. The second sheet part 52 is adhered to the second substrate part 40b, and positioned in the rear of an antenna 35 located on the second substrate part 40b. As a result, the first sheet part 51 and the second sheet part 52 are opposed to each other with an interval between them, in a state where they face a space 41.

According to the second embodiment, the magnetic part 50 which causes the electromagnetic waves 39 to detour is divided into the first sheet part 51 which corresponds to the first substrate part 40a and the second sheet part 52 which corresponds to the second substrate part 40b. In other words, a third substrate part 40c of the insulating substrate 34 is interposed between the first sheet part 51 and the second sheet part 52, and the first sheet part 51 is separated from the second sheet part 52 by the third substrate part 40c.

Therefore, the magnetic part 50 is not required to have flexibility. For example, a ceramic material which is obtained by baking magnetic powder can be used as the magnetic part 50. Therefore, the second embodiment has an advantage that the degree of freedom for selecting the material of the magnetic part 50 increases.

[Third Embodiment]

Figure 8:
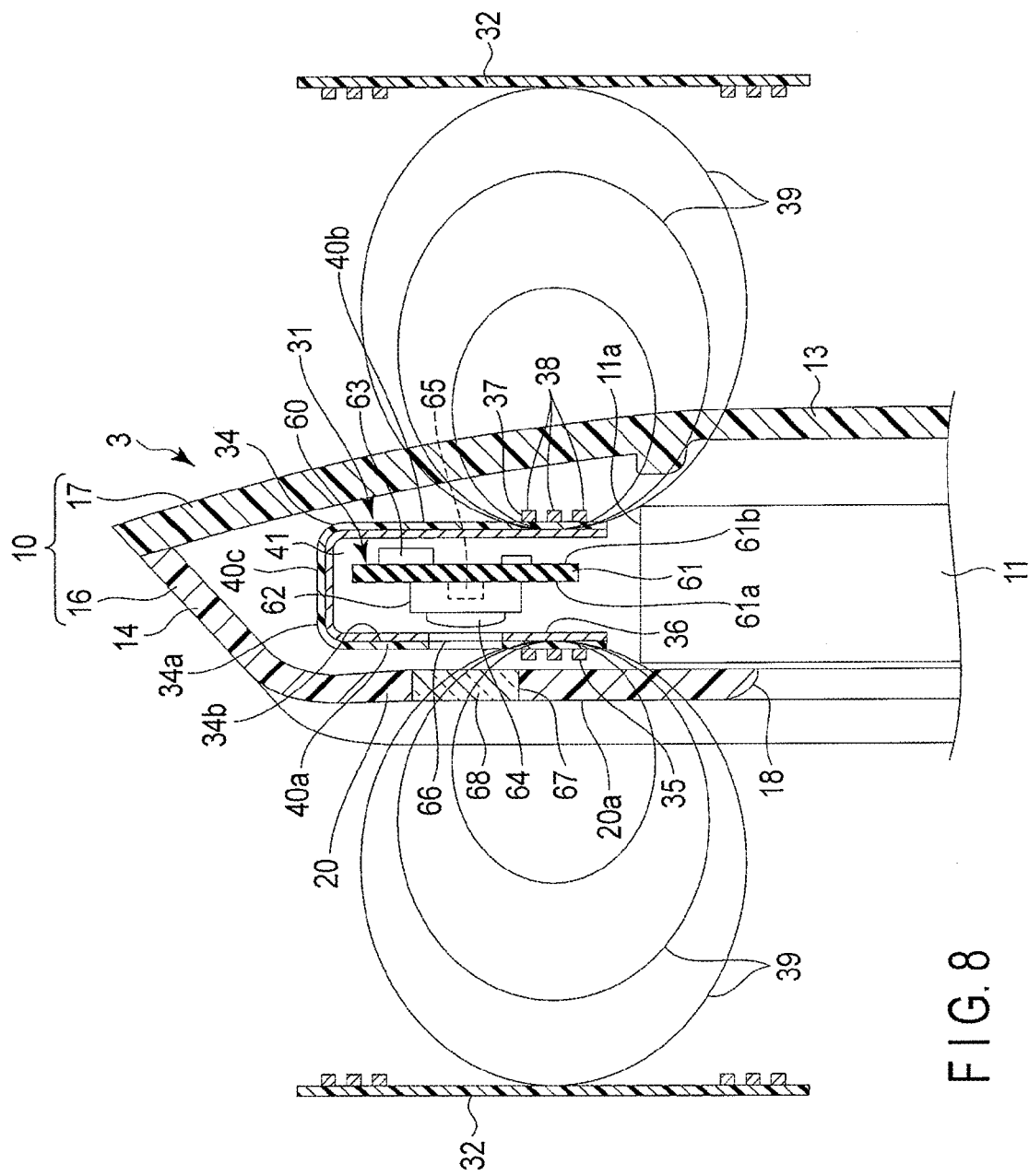
FIG. 8 is an exemplary cross-sectional view of a portable computer according to a third embodiment, in which a camera module is disposed in a region surrounded by an RFID antenna module.

FIG. 8 and FIG. 9 disclose a third embodiment.

The third embodiment is different from the first embodiment in that a camera module 60 is disposed together with an RFID antenna module 31 in a mounting space 24 inside a second housing 10. The structures of the RFID antenna module 31 and a portable computer 1 except the camera module 60 are basically the same as the first embodiment. Therefore, in the third embodiment, constituent elements which are the same as those in the first embodiment are denoted by the same respective reference numerals, and explanation thereof is omitted.

The camera module 60 is an example of an electronic part. The camera module 60 is contained in a space 41 between a first substrate part 40a and a second substrate part 40b of the RFID antenna module 31. As illustrated in FIG. 8 and FIG. 9, the camera module 60 includes a module substrate 61, a Web camera 62, and a plurality of IC chips 63.

The module substrate 61 is formed of an elongated printed wiring board which extends in a width direction of a display module 11, and held in the space 41 by a holder. The module substrate 61 includes a first surface 61a and a second surface 61b. The first surface 61a is opposed to the first substrate part 40a of the RFID antenna module 31. The second surface 61b is positioned in the rear of the first surface 61a, and opposed to the second substrate part 40b of the RFID antenna module 31. Therefore, the module substrate 61 is surrounded by the first to third substrate parts 40a, 40b, and 40c of an insulating substrate 34.

The Web camera 62 is mounted on the first surface 61a of the module substrate 61 by means such as soldering, and positioned in one end part 61c of the module substrate 61, which is located along a longitudinal direction of the module substrate 61. The Web camera 62 includes a front lens 64 which determines an imaging range, and an imaging device 65 which receives light which has passed through the front lens 64. The front lens 64 is directed to the first substrate part 40a.

The IC chips 63 are elements to control operation of the Web camera 62, and are mounted on the first surface 61a and the second surface 61b of the module substrate 61.

As illustrated in FIG. 8, the RFID antenna module 31 has a through hole 66 at a position which corresponds to the front lens 64 of the Web camera 62. The through hole 66 is a hole which pierces through the first substrate part 40a and a magnetic part 36 superposed on the first substrate part 40a, and is opposed to the front lens 64.

In addition, the through hole 66 which is opened in the RFID antenna module 31 is opposed to a camera window 67 which is opened in a front wall 12 of a second housing 10. The camera window 67 is covered with a lens cover 68 which has light transmittance.

According to the third embodiment, the camera module 60 can be disposed in a region which is surrounded by the RFID antenna module 31 that is bent to have a three-dimensional shape. Therefore, it is unnecessary to secure a region only for receiving the camera module 60 in the mounting space 24 inside the second housing 10. Therefore, it is possible to equip the second housing 10 with the camera module 60, without reducing the space for receiving LAN antennas 30a and 30b.

In addition, the camera module 60 can be surrounded by the magnetic part 36 of the RFID antenna module 31. Thereby, it is possible to take measures against noise and static electricity of the camera module 60, by using magnetic characteristics of the magnetic part 36.

Further, even when a metal part such as solder which bonds the IC chips 63 to the module substrate 61 is exposed on the module substrate 61, the magnetic part 36 which is interposed between the camera module 60 and the antenna 35 blocks electromagnetic waves 39 generated on the antenna 35. Therefore, it is possible to prevent the electromagnetic waves 39 from piercing through the metal part, and maintain good communication performance of the RFID antenna module 31.

[Fourth Embodiment]

FIG. 10 discloses a fourth embodiment.

The fourth embodiment is different from the third embodiment in positional relation between a camera module 60 and an RFID antenna module 31.

Specifically, one end part 61c of a module substrate 61 projects to a mounting space 24 inside a second housing 10 from a space 41 between a first substrate part 40a and a second substrate part 40b. Thereby, a Web camera 62 is exposed to the mounting space 24, without being surrounded by the RFID antenna module 31. A front lens 64 of the Web camera 62 is opposed to a lens cover of the second housing 10 in the mounting space 24.

According to the fourth embodiment, it is unnecessary to provide an insulating substrate 34 of the RFID antenna module 31 with a hole which is opposed to the front lens 64. Therefore, a special task of making a hole in the insulating substrate 34 can be omitted, and the fourth embodiment is convenient for securing the strength of the insulating substrate 34.

[Fifth Embodiment]

Figure 11:
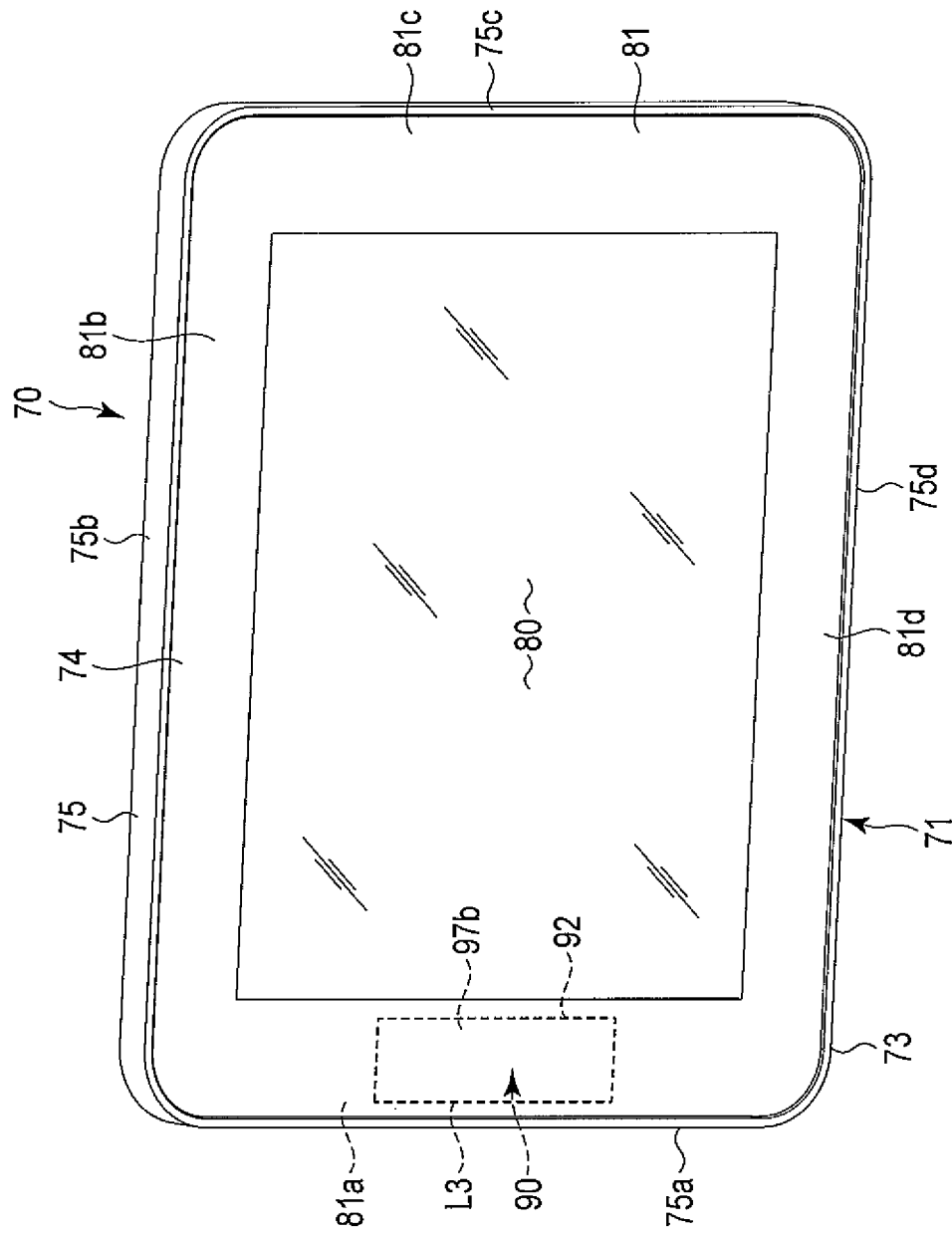
FIG. 11 is an exemplary perspective view of a slate portable computer according to a fifth embodiment.
Figure 12:
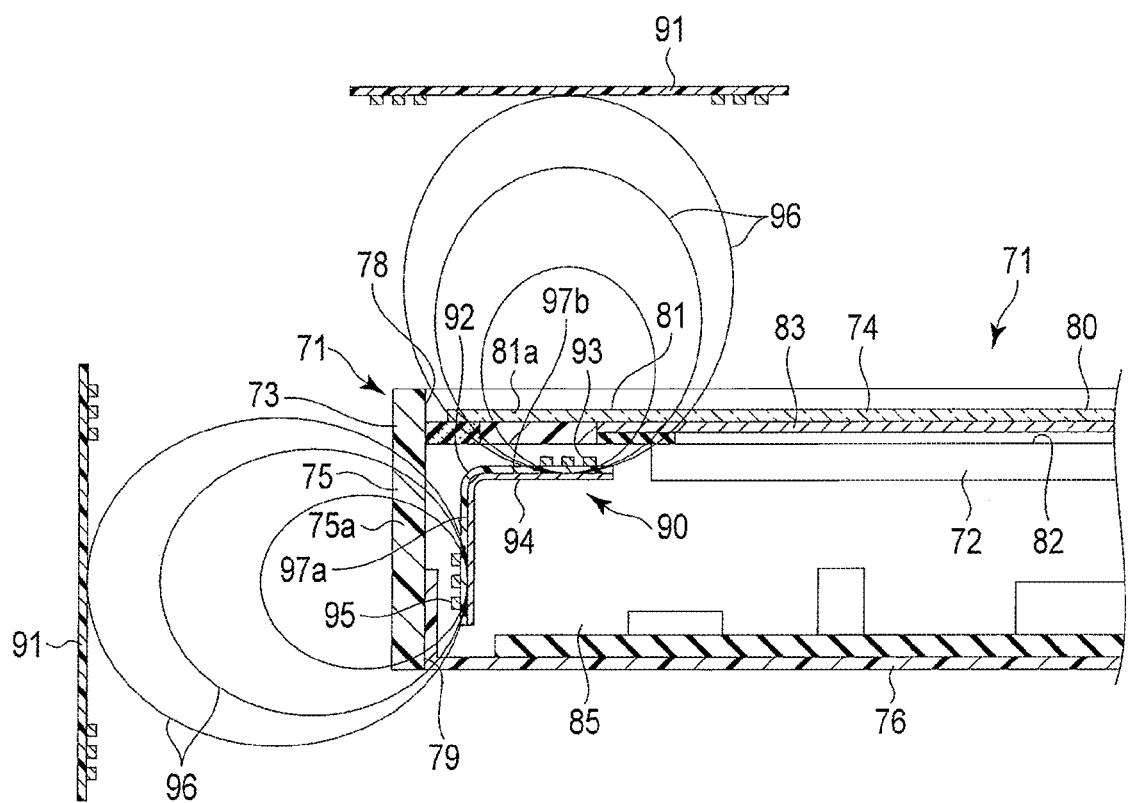
FIG. 12 is an exemplary cross-sectional view illustrating a state where information is exchanged between an RFID antenna module included in the portable computer and an RFID card by wireless communication using electromagnetic waves, in the fifth embodiment.

FIG. 11 and FIG. 12 disclose a fifth embodiment.

In the fifth embodiment, a tablet portable computer 70 is used as an example of the electronic apparatus. The portable computer 70 comprises a housing 71 and a display module 72 as main constituent elements.

The housing 71 has a flat and rectangular box shape, and includes a base 73 and a protective panel 74. The base 73 is formed of a non-conductor such as a synthetic resin material. The base 73 includes a peripheral wall 75 and a bottom wall 76. The peripheral wall 75 is an example of a first wall. The peripheral wall 75 has a rectangular frame shape which includes first to fourth side parts 75a, 75b, 75c, and 75d. The peripheral wall 75 includes a first opening part 78 and a second opening part 79, which are surrounded by the first to fourth side parts 75a, 75b, 75c and 75d. The bottom wall 76 covers the first opening part 78 of the peripheral wall 75.

The protective panel 74 is formed of a non-conductor such as glass and synthetic resin material. The protective panel 74 is an example of a second wall. The protective panel 74 includes a rectangular and transparent display region 80, and an opaque mask part 81. The mask part 81 includes first to fourth edge parts 81a, 81b, 81c, and 81d which surround the display region 80. The protective panel 74 covers the second opening part 79 of the peripheral wall 75. The mask part 81 of the protective panel 74 is adjacent to the peripheral wall 75, in a position in which the mask part 81 is perpendicular to the first to fourth side parts 75a, 75b, 75c and 75d of the peripheral wall 75.

Therefore, the protective panel 74 forms an outer wall of the housing 71 in cooperation with the base 73.

As illustrated in FIG. 12, the display module 72 is contained in the housing 71. The display module 72 includes a screen 82 which displays pictures and images. The screen 82 is located under the protective panel 74.

In addition, a touch panel 83 which has a handwriting input function is interposed between the protective panel 74 and the screen 82 of the display module 72. The touch panel 83 is adhered to a back surface of the protective panel 74.

As illustrated in FIG. 12, a mounting space 85 is provided inside the housing 71. According to the fifth embodiment, the mounting space 85 is a region which is surrounded by the first side part 75a of the peripheral wall 75, the bottom wall 76, and the first edge part 81a of the protective panel 74. The mounting space 85 is located around the display module 72, and out of the display module 72.

An RFID antenna module 90 for personal authentication is disposed in the mounting space 85 of the housing 71. The RFID antenna module 90 is an element which exchanges information with an RFID card 91 held by the user by short-range wireless communication using electromagnetic waves.

The RFID antenna module 90 includes an insulating substrate 92, an antenna 93, and a magnetic part 94. The insulating substrate 92 is formed of a flexible insulating film, and has a rectangular shape including long sides and short sides.

The antenna 93 is superposed on a surface of the insulating substrate 92. The antenna 93 includes an antenna pattern 95. The antenna pattern 95 is formed in a loop coil shape in a circumferential part of the surface of the insulating substrate 92, to run along the long sides and the short sides of the insulating substrate 92.

The magnetic part 94 is formed of a sheet-like composite material in the same manner as the first embodiment. The magnetic part 94 has a rectangular shape which has a size corresponding to the insulating substrate 92, and is adhered to a back surface of the insulating substrate 92. Therefore, the magnetic part 94 is positioned in the rear of the antenna 93, and has a function of causing electromagnetic waves 96 that are generated from the antenna 93 to detour and run along the back surface of the insulating substrate 92.

The RFID antenna module 90 is bent along one straight line L3 which is defined on the insulating substrate 92. The straight line L3 runs through the center of the insulating substrate 92, and extends in a direction of the long sides of the insulating substrate 92.

The insulating substrate 92 is divided into a first substrate part 97a and a second substrate part 97b, with the straight line L3 used as a boundary. The first and second substrate parts 97a and 97b are formed by bending the insulating substrate 92 at almost right angles along the straight line L3. By the bending, the magnetic part 94 is located inside the insulating substrate 92 along a direction of bending the insulating substrate 92.

The first substrate part 97a of the RFID antenna module 90 faces an internal surface of the first side part 75a of the peripheral wall 75 in the mounting space 85. The second substrate part 97b faces an internal surface of the first edge part 81a of the protective panel 74 in the mounting space 85.

Therefore, the antenna pattern 95 which is located on the first substrate part 97a is directed in a first direction which goes from the mounting space 85 to the first side part 75a of the peripheral wall 75. The antenna pattern 95 which is located on the second substrate part 97b is directed in a second direction which goes from the mounting space 85 to the first edge part 81a of the protective panel 74. The second direction is almost perpendicular to the first direction. Therefore, by bending the RFID antenna module 90, the antenna 93 is directed in a plurality of directions, which are different from each other, in the mounting space 85 of the housing 71.

As illustrated in FIG. 12, when the RFID card 91 is brought close to the first side part 75a of the peripheral wall 75, electromagnetic waves 96 are generated between the antenna 93 on the first substrate part 97a and the RFID card 91. Since the first substrate part 97a includes the magnetic part 94 which is superposed on the first substrate 97a such that the magnetic part 94 is located in the rear of the antenna 93, the electromagnetic waves 96 which have passed through the first substrate part 97a are caused to detour to run along the surface direction of the first substrate part 97a by the magnetic part 94.

When the RFID card 91 is brought close to the first edge part 81a of the protective panel 74, electromagnetic waves 96 are formed between the antenna 93 on the second substrate part 97b and the RFID card 91. Since the second substrate part 97b includes the magnetic part 94 which is superposed on the second substrate part 97b such that the magnetic part 94 is located in the rear of the antenna 93, the electromagnetic waves 96 which have passed through the second substrate part 97b are caused to detour to run along the surface direction of the second substrate part 97b by the magnetic part 94.

As a result, it is possible to avoid interference of communication magnetic fields between the antenna 93 on the first substrate part 97a and the antenna 93 on the second substrate part 97b. Therefore, the communication magnetic fields are prevented from being cancelled, wireless communication can be performed on both the side of the peripheral wall 75 and the side of the protective panel 74 of the housing 71, and good communication performance can be obtained.

In addition, the RFID antenna module 90 is bent to have a three-dimensional shape, by being bent along the straight line L3. Therefore, in the same manner as the first embodiment, the area occupied by the first and second substrate parts 97a and 97b can be reduced, and the RFID antenna module 90 can be made compact. Therefore, the RFID antenna module 90 having good communication performance can be disposed in the mounting space 85, without expanding the mounting space 85 inside the housing 71.

The first to fifth embodiments show the portable computers as examples of the electronic apparatus. The electronic apparatus is not limited to portable computers, however, but may be realized as, for example, liquid crystal televisions, in the same manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a non-conductive housing comprising a first wall and a second wall opposite to the first wall;
an electronic part inside the housing; and
an RFID antenna module inside the housing, the RFID antenna module comprising:
an insulating substrate comprising a plurality of substrate parts facing the first wall and the second wall of the housing, the substrate parts forming a first space therebetween;
a loop coil antenna on the substrate parts of the insulating substrate, the loop coil antenna configured to communicate by electromagnetic induction; and
a magnetic part on the substrate parts of the insulating substrate, the magnetic part located opposite to the antenna so as to face the first space,
wherein at least a part of the electronic part is in the first space of the RFID antenna module.

2. The electronic apparatus of claim 1, wherein:
the housing comprises a first wall and a second wall adjacent to the first wall,
the first wall and the second wall together form an outer wall of the housing,
the insulating substrate of the RFID antenna module comprises a first substrate part facing the first wall, and a second substrate part facing the second wall, and
the antenna is on the first substrate part and the second substrate part.

3. The electronic apparatus of claim 1, wherein:
the housing comprises a first wall and a second wall opposite to the first wall,
the first wall and the second wall together form an outer wall of the housing,
the insulating substrate of the RFID antenna module comprises a first substrate part facing the first wall, and a second substrate part facing the second wall, and
the antenna is on the first substrate part and the second substrate part.

4. The electronic apparatus of claim 1, wherein a first space which the magnetic part faces is between the first substrate part and the second substrate part.

5. The electronic apparatus of claim 4, further comprising: an electronic part in the first space.

6. The electronic apparatus of claim 5, wherein:
a mounting space outside the display module is formed between a circumferential part of the display module and the housing, and
the insulating substrate of the RFID antenna module in the mounting space.

7. The electronic apparatus of claim 1, wherein the electronic part is surrounded by the magnetic part of the RFID antenna module.

8. The electronic apparatus of claim 1, wherein:
the electronic part comprises a camera configured to import information from outside of the housing,
the camera comprises a lens configured to determine an imaging range, and
the insulating substrate and the magnetic part of the RFID antenna module comprises a through hole opposed to the lens.

9. The electronic apparatus of claim 1, wherein the electronic part comprises an IC chip.

10. The electronic apparatus of claim 1, wherein the first space opens toward the housing.

11. An electronic apparatus comprising:
a non-conductive housing comprising a first wall and a second wall opposite to the first wall;
an electronic part inside the housing; and
an RFID antenna module inside the housing,
the RFID antenna module comprising;
an insulating substrate comprising a first substrate part facing the first wall of the housing, a second substrate part facing the second wall of the housing, a third substrate part extending between the first substrate part and second substrate part, the first substrate part and second substrate part forming a first space therebetween which opens toward the housing;
a loop coil antenna on the first substrate part to the third substrate part of the insulating substrate, the loop coil antenna configured to communicate by electromagnetic induction; and
a magnetic part on the first substrate part to the third substrate part of the insulating substrate, the magnetic part located opposite to the antenna so as to face the first space,
wherein at least a part of the electronic part is in the first space of the RFID antenna module.

12. An electronic apparatus comprising:
a non-conductive housing comprising a mounting space;
a part inside the mounting space; and
an RFID antenna module inside the mounting space, the RFID antenna module comprising:
an insulating substrate comprising a plurality of substrate parts, the substrate parts forming a first space therebetween;
a loop coil antenna on the substrate parts of the insulating substrate, the loop coil antenna configured to communicate by electromagnetic induction; and
a magnetic part on the substrate parts of the insulating substrate, the magnetic part located opposite to the antenna so as to face the first space,
wherein at least a part of the part is in the first space of the RFID antenna module.

* * * * *